(12) United States Patent
Beyda et al.

(10) Patent No.: US 7,023,812 B1
(45) Date of Patent: Apr. 4, 2006

(54) SYSTEM AND METHOD FOR IMPROVING MODEM TRANSMISSION THROUGH PRIVATE BRANCH EXCHANGES, CENTRAL OFFICES, AND OTHER SYSTEMS

(75) Inventors: William J. Beyda, Cupertino, CA (US); Shmuel Shaffer, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/504,631

(22) Filed: Feb. 15, 2000

(51) Int. Cl.
*H04B 3/20* (2006.01)
*H04M 9/08* (2006.01)

(52) U.S. Cl. ............... 370/286; 370/292; 379/406.01; 379/406.1

(58) Field of Classification Search ............ 370/276, 370/282, 286, 289–292, 295; 379/406, 410, 379/411, 406.01, 406.1, 406.12
See application file for complete search history.

(56) References Cited

U.S. PATENT DOCUMENTS

| | | | | |
|---|---|---|---|---|
| 4,970,715 A | | 11/1990 | McMahan | 370/287 |
| 4,995,030 A | * | 2/1991 | Helf | 370/290 |
| 5,280,473 A | | 1/1994 | Rushing et al. | 370/289 |
| 5,283,815 A | * | 2/1994 | Chennakeshu et al. | 375/330 |
| 5,353,305 A | * | 10/1994 | Fukuda et al. | 375/231 |
| 5,504,810 A | * | 4/1996 | McNair | 379/189 |
| 5,515,398 A | * | 5/1996 | Walsh et al. | 375/222 |
| 5,682,378 A | | 10/1997 | Betts et al. | 370/286 |
| 5,761,638 A | * | 6/1998 | Knittle et al. | 704/233 |
| 5,790,658 A | | 8/1998 | Yip et al. | 379/406.09 |
| 5,909,384 A | * | 6/1999 | Tal et al. | 708/322 |
| 6,317,419 B1 | * | 11/2001 | Olafsson et al. | 370/292 |
| 6,377,683 B1 | * | 4/2002 | Dobson et al. | 379/406.12 |
| 6,480,532 B1 | * | 11/2002 | Vareljian | 375/222 |

* cited by examiner

*Primary Examiner*—John Pezzlo
*Assistant Examiner*—Saba Tsegaye

(57) ABSTRACT

A modem including an echo canceller adapted to determine locations of far-end echo sources. The echo canceller is adapted to send a signal to turn off network echo suppressors and enter a training mode. A training signal at a predetermined modem training frequency is sent from the modem to the second modem in the link. The return signal is then sampled by the sending modem. Any far-end echoes manifest themselves as sine waves at the modem training frequency, delayed in time. The time difference between the peak of the training signal and the echo signals is used to determine the echo delay.

11 Claims, 4 Drawing Sheets

SYSTEM AND METHOD FOR IMPROVING MODEM TRANSMISSION THROUGH PRIVATE BRANCH EXCHANGES, CENTRAL OFFICES, AND OTHER SYSTEMS

BACKGROUND OF THE INVENTION

1. Field of the Invention

The present invention relates to communications systems and, in particular, to a system improving modem transmission by adjusting the modem's echo cancellation scheme based on the connection type.

2. Description of the Related Art

Digital communications systems take analog signals and digitize them, pass them through the system, and convert them back into analog form. The digital-to-analog (D/A) and analog-to-digital (A/D) conversions can cause discontinuities in the communications link known as "echo." Such echoes represent an undesired or interfering signal to the receiver in the modem. Echoes are typically classified as near-end or far-end echoes. Near-end echoes are reflections which normally occur relatively close in distance and not delayed too long in time relative to the transmitting modem. Far-end echoes are reflections which are remote, usually in distance and time, to the transmitting modem and typically occur at the remote modem. In particular, a digital-to-analog conversion at the transmitting modem can cause a near-end echo (relative to the transmitting modem), and an analog-to-digital conversion at the receiving modem can cause a far-end echo.

Conventional echo cancellation schemes assume that there is only one D/A and A/D conversion in each connection, that is, there is only one switching device performing such conversions in the link between the transmitting and receiving modems. Such a scenario is illustrated in FIG. 1. As shown, a telecommunications system 100 includes a modem 102a and a modem 102b. Modem 102a and modem 102b communicate via a switch 104. Assuming modem 102a is transmitting, an A/D conversion takes place between modem 102a and the switch 104, and a D/A conversion takes place between the switch 104 and the modem 102b. The A/D conversion can cause near-end echo, and the D/A conversion can cause far-end echo.

Conventional echo cancellation schemes look for echo under 50 milliseconds in near-end echo cancellation circuitry, and echo of 100–150 milliseconds for far-end echo cancellation. If additional echo is introduced intermediate to either of the modems and the switch, conventional echo cancellation schemes can fail. While echo cancellation schemes are known which attempt to converge on intermediate echo, such schemes do not anticipate multiple far-end echo sources. For example, an echo cancellation scheme described in U.S. Pat. No. 4,970,715 looks for a most-dominant line echo, which may be a far-end or an intermediate echo. The system described then cancels the detected echo. However, the system assumes that there is only one non-near-end echo source.

SUMMARY OF THE INVENTION

These and other drawbacks in the prior art are overcome in large part by a system and method for echo detection and cancellation according to the present invention. A modem according to one implementation of the present invention includes an echo canceller adapted to determine locations of far-end echo sources. The echo canceller is adapted to send a signal to turn off network echo suppressors and enter a training mode. A training signal at a predetermined modem training frequency is sent from the modem to the second modem in the link. The return signal is then sampled by the sending modem. Any far-end echoes manifest themselves as sine waves at the modem training frequency, delayed in time. The time difference between the peak of the training signal and the echo signals is used to determine the echo delay.

A better understanding of the invention is obtained when the following detailed description is considered in conjunction with the following drawings.

DETAILED DESCRIPTION OF THE INVENTION

FIGS. 1–6 illustrate an improved system and method for echo cancellation. A modem according to an implementation of the invention includes an echo canceller configured to adaptively identify and cancel plural sources of far-end echo.

Figure 1:
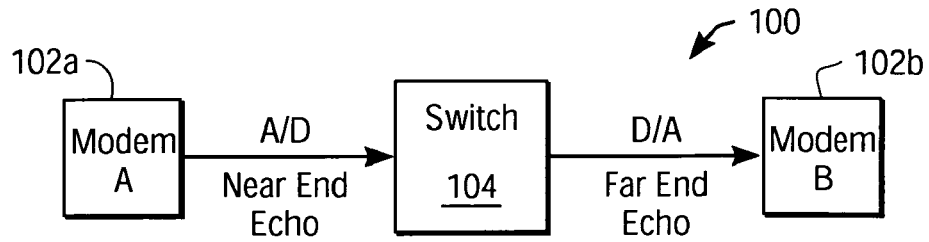
FIG. 1 is a diagram of a modem-to-modem communication path.
Figure 2A:
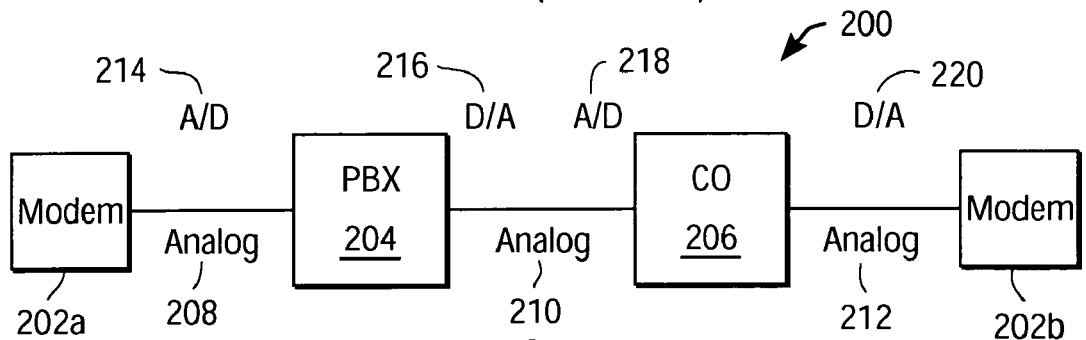
FIGS. 2A–2C are diagrams of other modem-to-modem communication paths.
Figure 2B:
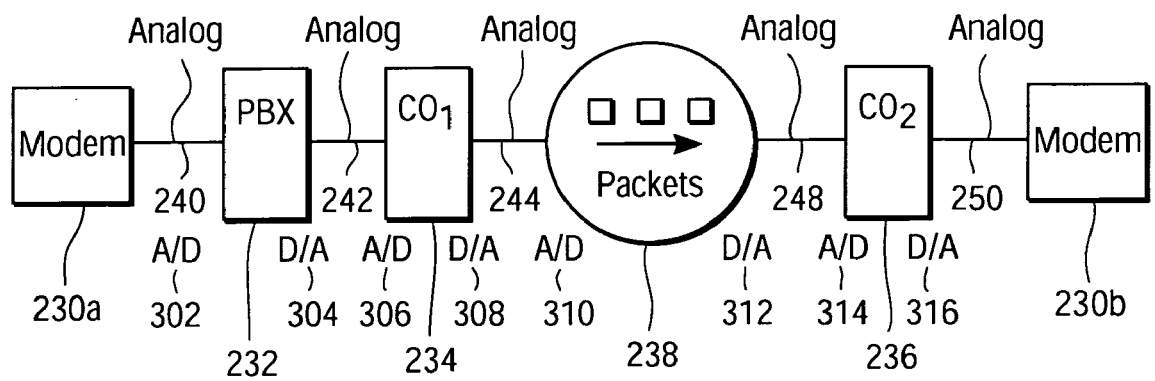
Figure 2C:
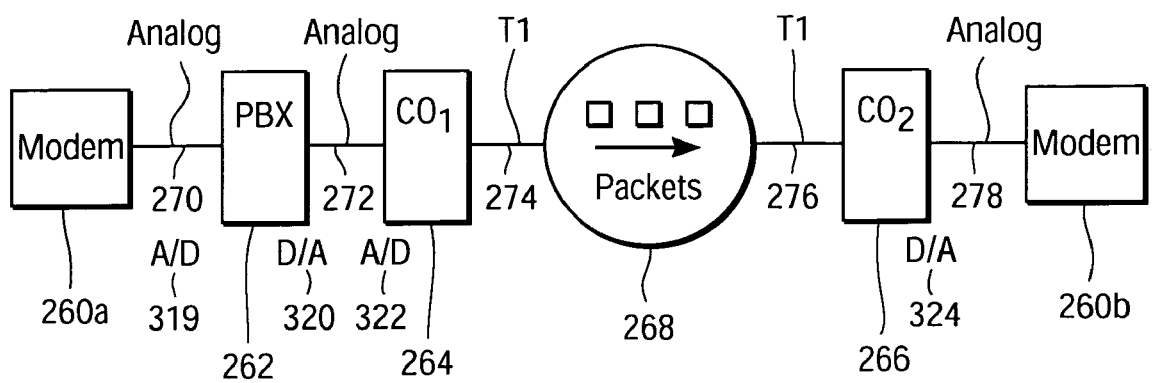

FIGS. 2A–2C illustrate exemplary modem-to-modem configurations in which the teachings of the present invention are applicable. Shown in FIG. 2A is a system 200 including a first modem 202a, a second modem 202b, a private branch exchange (PBX) 204, and a central office (CO) 206. Analog lines 208, 210, and 212 interconnect the modem 202a, the PBX 204, the CO 206, and the modem 202b, as shown. Thus, an analog-to-digital conversion 214 and a digital-to-analog conversion 216 are required via the PBX 204, and an analog-to-digital conversion 218 and a digital-to-analog conversion 220 are required via the CO 206. As will be explained in greater detail below, an echo canceller on the modem 202a is configured to identify echoes resulting from the A/D conversion 214, D/A conversion 216, the A/D conversion 218, and the D/A conversion 220.

FIG. 2B illustrates another modem-to-modem communication system employing echo cancellation according to the present invention. Shown are a modem 230a, a PBX 232, a first CO 234, a packet network 238, a second CO 236, and a second modem 230b. An analog link 240 links the modem 230a and the PBX 232; an analog link 242 links the PBX 232 and the CO 234; an analog link 244 links the CO 234 and the packet network 238; an analog link 248 links the packet network 238 and the CO 236; and an analog link 250 links the CO 236 and the modem 230b. Thus, an A/D conversion 302 and a D/A conversion 304 are required via the PBX 232; an A/D conversion 306 and a D/A conversion 308 via required at the CO 234; an A/D conversion 310 and a D/A conversion 312 are required via the packet network 238; and an A/D conversion 314 and a D/A conversion 316 are required via the CO 236. An echo canceller according to the present invention is adapted to identify and cancel echoes resulting from the A/D conversion 302, D/A conversion 304, the A/D conversion 306, the D/A conversion 308, the A/D conversion 310, the D/A conversion 312, the A/D conversion 314, and the D/A conversion 316.

A similar configuration is shown in the system of FIG. 2C. Shown are a modem 260*a*, a PBX 262, a first CO 264, a packet network 268, a second CO 266, and a second modem 260*b*. An analog link 270 links the modem 260*a* and the PBX 262; an analog link 272 links the PBX 262 and the CO 264; a digital T1 link 274 (or E1 link in other situations) links the CO 264 and the packet network 268; a digital T1 link 276 (or E1 link in other situations) links the packet network 268 and the CO 266; and an analog link 278 links the CO 266 and the modem 260*b*. An echo canceller according to the present invention is adapted to identify and cancel echoes resulting from the A/D conversion 318, D/A conversion 320, the A/D conversion 322, and the D/A conversion 324. It is noted that, while specific network topologies are shown, the invention is applicable to other configurations. For example, the packet networks 238 and 268 discussed above could include telephony-over-LAN systems, or an analog link could be replaced with a DSL link. Thus, the figures are exemplary only.

More particularly, the echo cancellers according to the present invention are adapted to send a signal to turn off network echo suppressors (not shown) and enter a training mode. A training signal at a predetermined frequency is sent from the first modem to the second modem. The return signal is then sampled by the sending modem. Any far-end echoes will manifest themselves as sine waves at the modem training frequency, delayed in time. The time difference between the peak of the training signal and the echo signals is used to determine the echo delay.

Figure 3:
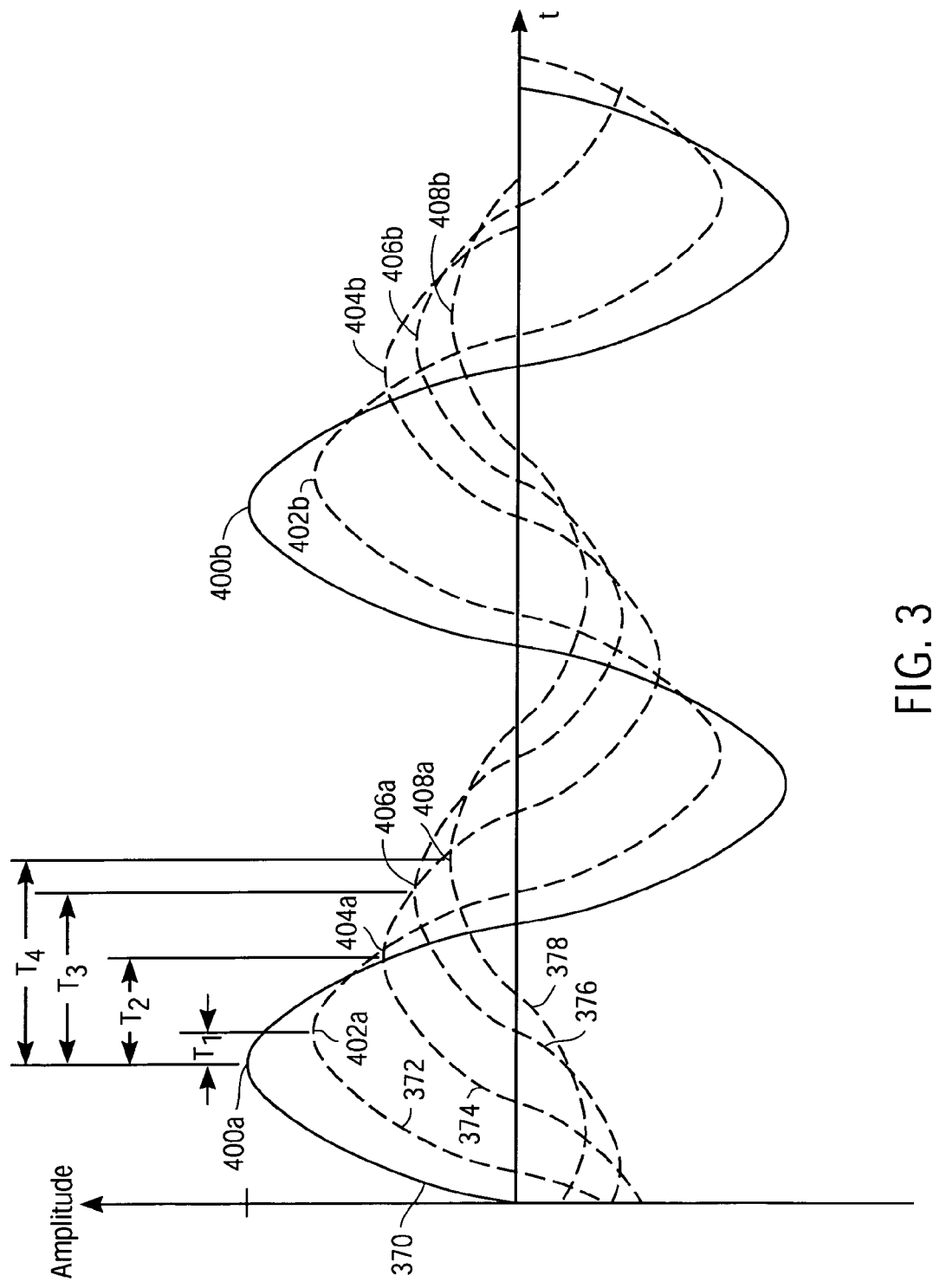
FIG. 3 is a diagram illustrating echo signals according to an embodiment of the invention.

Operation of an implementation of the invention is illustrated schematically with reference to FIG. 3. In particular, FIG. 3 illustrates a modem training signal 370 and echo signals 372–378 of the same frequency which result during training of the configuration (for example) of FIG. 2A. That is, four echo sources (from two A/D and two D/A conversions) exist in the system, as described with reference to FIG. 2A. Each of the echo signals is increasingly delayed and is of increasingly lower amplitude.

In operation, the modem 202*a*'s echo canceller sends the training signal 370. The A/D conversion 214 causes the echo signal 372, delayed by time T1. The D/A conversion 216 causes the echo signal 374, delayed by time T2. The A/D conversion 218 causes the echo signal 376, delayed by time T3. The D/A conversion 220 causes the echo signal 378, delayed by time T4. As will be explained in greater detail below, the modem 202*a*'s echo canceller detects each of the echo signals by detecting their peaks (or relative peaks) and measuring their delay with respect to the primary signal.

Figure 4:
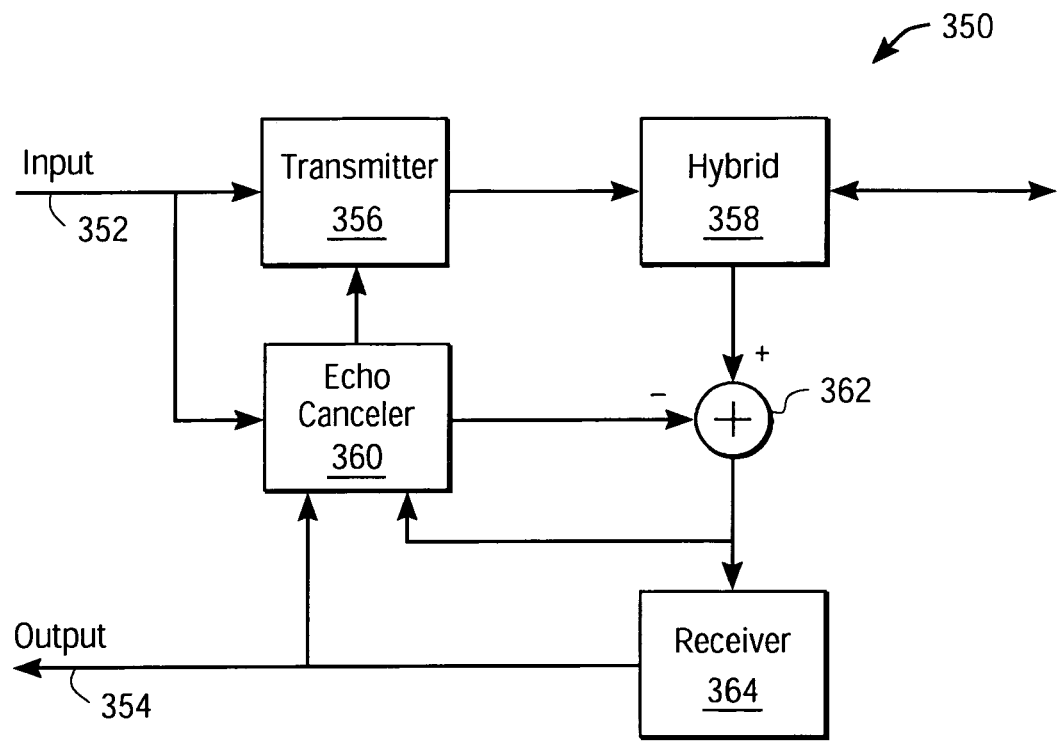
FIG. 4 is a diagram of an echo canceling modem according to an embodiment of the invention.

Turning now to FIG. 4, an exemplary modem 350 implementing echo cancellation according to an embodiment of the invention is shown. A modem transmitter 356 receives digital data 352 and provides modulated analog signal output signals to a hybrid 358 which couples the signals to a telephone line. A typical transmitter may include a phase encoder and a digital-to-analog converter. The modem 350 further includes an echo canceller 360 coupled to receive input data 352 and deliver a replica of the echo(s) contained in the receive signal. A summer 362 is coupled to accept the echo replica(s) from the echo canceller and subtract the echo from the receive signal, thereby canceling the echo contained in the receive signal. The output of the summation circuit 362 is further applied to the echo canceller 360 for adjusting the delay period. The output of the summation circuit 362 is also provided to the receiver 364, which performs decoding and analog-to-digital conversion to output digital data 354.

Figure 5:
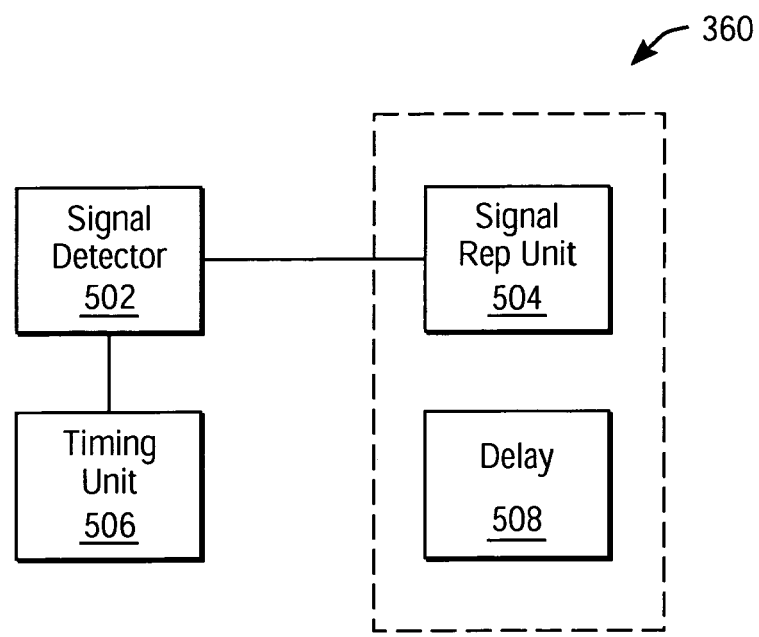
FIG. 5 is a diagram of an echo canceller according to an embodiment of the present invention.

FIG. 5 is a block diagram of the echo canceller. As shown, the echo canceller 360 includes a signal detection unit (SDU) 502, a timing unit (TU) 506, a delay unit (DU) 508, and a signal reproduction unit (SRU) 504. The signal detection unit 502 is adapted to detect peaks 400*a*, 400*b* (FIG. 3) of the data signal 370, as well as the peaks 402*a*, 402*b* of echo signals 372, the peaks 404*a*, 404*b* of echo signals 374, the peaks 406*a*, 406*b* of echo signals 376, and the peaks 408*a*, 408*b* of the echo signal 378. The timing unit 506 includes a timer (not shown) for determining the times T1, T2, T3, and T4 between the data signal and the echo signals. The timer begins timing once the primary peak of the return transmit signal is received; the times the echo peaks are detected are saved for echo cancellation later, for example, by the delay unit 508. Once the timing of the echo signals is determined, the correction can proceed based on the determined timing. In particular, the signal reproduction unit 504 reproduces the transmit signal at a delay provided by the delay unit 508 which is then cancelled by the summation circuit 362. Thus, the echo canceller 360 provides to the summation circuit 362 replicas of the received echo signals delayed in time by the appropriately determined delays.

Figure 6:
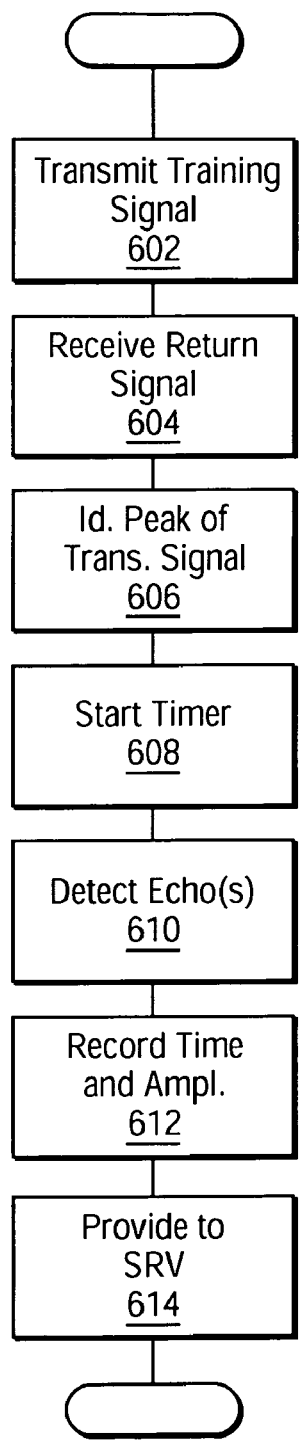
FIG. 6 is a flowchart illustrating operation of an embodiment of the invention.

FIG. 6 is a flowchart illustrating operation of an embodiment of the invention. In a step 602, a near-end modem transmits a modem training signal at a predetermined frequency. In a step 604, the sending modem receives the return signal from the remote modem. As described above, the receive signal includes the training signal, as well as one or more echo signals, representing near-end echo and one or more sources of far-end echo. In a step 606, the signal detection unit 502 identifies a peak of the return transmit signal. In a step 608, the timing unit 506 activates a timer to time the period(s) to the next (echo) peak. In a step 610, the signal detector detects the echo peak or peaks. In a step 612, the timing unit 506 records the arrival time of the detected peak(s) of the echo signal(s). In a step 614, the timing information is provided to the signal replication unit 504 and delay unit 508 for use in echo cancellation.

The invention described in the above detailed description is not intended to be limited to the specific form set forth herein, but is intended to cover such alternatives, modifications and equivalents as can reasonably be included within the spirit and scope of the appended claims.

What is claimed is:

1. A modem, comprising:
   a signal detector adapted to receive a signal, the signal including a data component and a plurality of echo components, said plurality of echo components comprising a plurality of far end echo components resulting from multiple far end echo sources, said data component comprising a return signal from a remote modem of a sinusoidal training signal transmitted from the modem;
   a timing unit adapted to identify delays of said plurality of echo components by timing intervals between peaks of said plurality of echo components and said data component; and
   an echo cancellation unit adapted to cancel a plurality of echoes resulting from multiple far end echo sources at said modem once said delays have been identified.

2. A modem in accordance with claim 1, said data component comprising a sinusoid at a predetermined frequency.

3. A modem in accordance with claim 2, said one or more echo components comprising signals at substantially said predetermined frequency and at differing amplitudes.

4. A modem in accordance with claim 3, said timing unit adapted to identify said delays by determining periods between peaks of said data component and said one or more echo components.

5. An echo cancellation method, comprising:
   transmitting a training sinusoid to a remote modem;
   receiving a return signal, said return signal comprising said training sinuosoid received from said remote modem and a plurality of far end echo signals having substantially the same frequencies as said training sinusoid, said plurality of far end echo signals resulting from multiple far end echo sources;
   identifying echoes by determining delays between peaks of said return training sinusoid and peaks of said plurality of far end echo signals, said determining delays comprising timing intervals between peaks; and
   canceling echoes from said multiple far end echo signals based on said delays at a transmitting modem.

6. An echo cancellation system, comprising:
   means for transmitting a training sinusoid to a remote modem;
   means responsive to said transmitting means for receiving a return signal, said return signal comprising said training sinuosoid received from said remote modem and a plurality of far end echo signals having substantially the same frequencies as said training sinusoid, said plurality of far end echo signals resulting from multiple far end echo sources;
   means responsive to said receiving means for identifying echoes by determining delays between peaks of said return training sinusoid and peaks of said plurality of far end echo signals, said identifying means including means for timing delays between peaks; and
   means for canceling echoes from said multiple far end echo sources based on said delays at a transmitting modem.

7. A method, comprising:
   receiving a signal at a modem, the signal including a data component received from a remote modem and a plurality of far end echo components resulting from multiple far end echo sources, the data component a training sinusoid transmitted from the modem to the remote modem;
   identifying delays of a plurality of far end echo components by timing intervals between peaks; and
   canceling one or more far end echoes resulting from said multiple far end echo sources at said modem once said delays have been identified.

8. A method in accordance with claim 7, said data component comprising a sinusoid at a predetermined frequency.

9. A method in accordance with claim 8, said echo signals comprising signals at substantially said predetermined frequency and at differing amplitudes.

10. A method in accordance with claim 9, including identifying said delays by determining periods between peaks of said data component and said one or more echo components.

11. A method for canceling multiple echo signal components, comprising:
    transmitting a training signal from a local modem to a remote modem;
    detecting a return signal at the local modem, said return signal comprising said training signal and a plurality of far end echo components resulting from multiple far end echo sources;
    determining intervals between peaks of said plurality of echo components and said training signal in said return signal;
    compensating for said plurality of far end echo components resulting from said multiple far end echo sources at said local modem; and
    transmitting echo-compensated data signals from said local modem to said remote modem.

* * * * *